US009864812B2

(12) United States Patent
Rochelle et al.

(10) Patent No.: US 9,864,812 B2
(45) Date of Patent: Jan. 9, 2018

(54) CONVERTING SPREADSHEET APPLICATIONS TO WEB-BASED APPLICATIONS

(71) Applicant: Google Inc., Mountain View, CA (US)

(72) Inventors: Jonathan P. Rochelle, Chester, NJ (US); Micah G. Lemonik, New York, NY (US); Farzad Khosrowshahi, Pleasantville, NY (US); John Stephen Danaher, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 14/681,820

(22) Filed: Apr. 8, 2015

(65) Prior Publication Data

US 2015/0212980 A1     Jul. 30, 2015

Related U.S. Application Data

(62) Division of application No. 11/281,898, filed on Nov. 18, 2005, now Pat. No. 9,009,582.

(Continued)

(51) Int. Cl.
*G06F 17/30* (2006.01)
*G06F 17/21* (2006.01)
(Continued)

(52) U.S. Cl.
CPC ...... *G06F 17/30893* (2013.01); *G06F 17/211* (2013.01); *G06F 17/227* (2013.01); *G06F 17/2247* (2013.01); *G06F 17/246* (2013.01)

(58) Field of Classification Search
CPC .......................... G06F 17/30179; G06F 17/246
See application file for complete search history.

(56) References Cited

U.S. PATENT DOCUMENTS 6,691,281 B1   2/2004 Sorge et al.
6,701,485 B1 * 3/2004 Igra ........................ G06F 17/246
                                                   715/209

(Continued)

FOREIGN PATENT DOCUMENTS

JP         2003303103 A  * 10/2003

OTHER PUBLICATIONS

Office Action from U.S. Appl. No. 11/278,345, dated Apr. 10, 2009, 30 pages.

(Continued)

*Primary Examiner* — Kavita Padmanabhan
*Assistant Examiner* — Tyler Schallhorn
(74) *Attorney, Agent, or Firm* — Young Basile Hanlon & MacFarlane, P.C.

(57) ABSTRACT

A networked version of a spreadsheet application can be automatically created from an existing "conventional" spreadsheet. In one implementation, a server may obtain a data file, where the data file represents a networked version of a spreadsheet application that was converted from the "conventional" application and the data file defines characteristics of the networked version of the spreadsheet application including logic and interactivity attributes of cells in the networked version of the spreadsheet application. A remote request may be received from a client to access the networked version of the spreadsheet application. In response, the server may transmit a document to the client that represents a portion of the networked version of the spreadsheet application that the interactivity attributes specify as being displayable to the client.

20 Claims, 13 Drawing Sheets

Related U.S. Application Data

(60) Provisional application No. 60/629,577, filed on Nov. 19, 2004.

(51) Int. Cl.
*G06F 17/22* (2006.01)
*G06F 17/24* (2006.01)

(56) References Cited

U.S. PATENT DOCUMENTS

| | | | |
|---|---|---|---|
| 6,779,151 B2* | 8/2004 | Cahill | G06F 17/246 707/999.002 |
| 6,857,102 B1* | 2/2005 | Bickmore | G06F 17/2247 707/E17.121 |
| 6,948,134 B2* | 9/2005 | Gauthier | G06F 17/246 707/999.01 |
| 6,973,619 B1* | 12/2005 | Hirose | G06F 17/30905 707/E17.121 |
| 6,988,241 B1 | 1/2006 | Guttman et al. | |
| 7,082,569 B2* | 7/2006 | Voshell | G06F 17/246 715/212 |
| 7,233,951 B1 | 6/2007 | Gainer et al. | |
| 7,523,395 B1 | 4/2009 | Namait et al. | |
| 8,307,119 B2 | 11/2012 | Rochelle et al. | |
| 8,578,399 B2* | 11/2013 | Khen | G06F 9/541 715/212 |
| 9,009,582 B2 | 4/2015 | Rochelle et al. | |
| 9,026,903 B1* | 5/2015 | Michael | G06F 17/2247 715/235 |
| 2002/0091871 A1* | 7/2002 | Cahill | G06F 17/246 719/315 |
| 2002/0169799 A1* | 11/2002 | Voshell | G06F 17/246 715/212 |
| 2002/0188629 A1* | 12/2002 | Burfoot | G06F 17/246 715/213 |
| 2002/0194095 A1 | 12/2002 | Koren | |
| 2003/0014513 A1 | 1/2003 | Ruths et al. | |
| 2003/0055847 A1 | 3/2003 | Cho et al. | |
| 2003/0105845 A1 | 6/2003 | Leermakers | |
| 2004/0181748 A1 | 9/2004 | Jamshidi et al. | |
| 2004/0267871 A1 | 12/2004 | Pratley et al. | |
| 2005/0060342 A1 | 3/2005 | Farag | |
| 2005/0246635 A1* | 11/2005 | Hirose | G06F 17/30905 715/273 |
| 2005/0268215 A1 | 12/2005 | Battagin et al. | |
| 2006/0015805 A1 | 1/2006 | Humenansky et al. | |
| 2009/0235154 A1* | 9/2009 | Khen | G06F 9/541 715/219 |

OTHER PUBLICATIONS

Office Action from U.S. Appl. No. 11/278,345, dated Aug. 31, 2011, 61 pages.
Gilbert et al., 75 Essential Excel tips, TechRepublic, Version 4.0, Feb. 2005, pp. 1-30.
Mario Sixtus, "The network re-invents: A stroll through the Web 2.0" c't *Magazin fur Computer Technik*, vol. 2006, No. 5, Feb. 20, 2006, machine translation of http://www.heise.de/ct/06/05/144, printed Aug. 26, 2008.
International Search Report and Written Opinion for corresponding International Application No. PCT/US2007/065608, dated Sep. 20, 2007, 11 pages.
Office Action for U.S. Appl. No. 11/278,345, dated May 14, 2010, 45 pages.
Office Action for U.S. Appl. No. 11/278,345, dated Apr. 10, 2009, 30 pages.
Stowe, "XML in Excel and the Spreadsheet Component", MSDN, Aug. 2001, http://msdn.microsoft.com/library/en-us/dnexcl2k2/html.odc_xlsmlinss.asp?frame=true, 5 pages.
Stowe, "XML spreadsheet Reference", MSDN, Aug. 2001, http://msdn.microsoft.com/library/en-us/dnexcl2k2/html.odc_xmlss.asp?frame=true, 27 pages.
McLeod, "Can I Get That as a Spreadsheet", Archived Feb. 5, 2004.
Sixtus, "Das Netz erfindet sich neu: Ein Streifzug durch das Web 2.0" *C'T Magazin fur Computer Technik*, No. 5, 2006, pp. 144-151. (With partial English translation).
Palmer, et al., "Operation Transforms for a Distributed Shared Spreadsheet", Proceedings of the 1998 ACM conference on Computer supported cooperative work, Nov. 14-18, 1998, p. 69-78.
"Multimedia Information Sharing in the Heterogeneous Environment", 1997 IEEE International Conference on Intelligent Processing Systems, Oct. 28-31, 1997, pp. 1044-1046. [Zhang et al.].

\* cited by examiner

```xml
<?xml version="1.0"?>
-    <model XL2WebVersion="V4.48">
         <Creator Copyright="Google" Patent="Pending"/>
         <PublisherUsed name="Microsoft Excel" version="10.0" build="2614"/>
         <misc>
             <calculation iteration="100" tolerance="0.001" fullcalc="False"/>
         </misc>
         <books count="1" mainbook="Book1">
             <book name="Book1">
                 <sheets count="3">
                     <sheet name="Sheet1" rows="7" columns="8">
                         <constants>
                             <fx r1="1" c1="4">Simple Illustration</fx>
                             <fx r1="3" c1="3">1</fx>
                             <fx r1="3" c1="4">2</fx>
                             <fx r1="3" c1="5">3</fx>
                             <fx r1="3" c1="6">4</fx>
                             <fx r1="3" c1="7">5</fx>
                             <fx r1="4" c1="3">5</fx>
                             <fx r1="4" c1="4">4</fx>
                             <fx r1="4" c1="5">3</fx>
                             <fx r1="4" c1="6">2</fx>
                             <fx r1="4" c1="7">1</fx>
                             <fx r1="3" c1="2">Input 1</fx>
                             <fx r1="4" c1="2">Input 2</fx>
                             <fx r1="5" c1="2">divide</fx>
                         </constants>
                         <formulas>
                             <fx r1="5" c1="3" r="1" c="5">=IF
                                 (R5C2="add", SUM(R[-2]C:R[-1]C),
                                 IF(R5C2="subtract",R[-2]C-R[-1]C,
                                 IF(R5C2="multiply",R[-2]C*R[-1]C,
                                 IF(R5C2="divide",R[-2]C/R[-1]C))))
                             </fx>
                         </formulas>
                     </sheet>
                     <sheet name="Sheet2" rows="1" columns="1">
                     <sheet name="Sheet3" rows="1" columns="1">
                 </sheets>
                 <namedFormulas count="0"/>
             </book>
         </books>
     <smartcells>
         <inputs count="0">
         <outputs count="0">
     </smartcells>
</model>
```

310 → (bracket indicating the `<formulas>...</formulas>` block)

FIG. 3

```
<?xml version="1.0"?>
  <model XL2WebVersion="V4.48">
      <Creator Copyright="Google" Patent="Pending"/>
      <PublisherUsed name="Microsoft Excel" version="10.0" build="2614"/>
      <misc>
        <title>PatentIllus</title>
        <header>
        <hideblankrows on="false"/>
        <tablelayoutfixed on="false"/>
        <usagetracking on="false"/>
        <customscriptoptions eventreginputs="false"
            eventlistinputs="false"/>
      </misc>
      <formatlists>
          <stylelists count="10">
              <style ID="1">font-family:Arial; font-size:10pt; color:#000000;
                  background:#FFFFFF; text-align:left; vertical-align:bottom;
                  width:48pt; height:15.7pt; </style>
              <style ID="2">font-family:Arial; font-size:10pt; color:#000000;
                  background:#FFFFFF; text-align:left; vertical-align:bottom;
                  width:48pt; height:13.5pt; </style>
              <style ID="3">font-family:Arial; font-size:10pt; color:#000000;
                  background:#FFFFFF; text-align:left; vertical-align:bottom;
                  width:48pt; height:12.7pt; </style>
              <style ID="4">font-family:Arial; font-size:10pt; color:#000000;
                  background:#FFCC99; text-align:left; vertical-align:bottom;
                  width:48pt; height:12.7pt; </style>
              <style ID="5">font-family:Arial; font-size:10pt; color:#000000;
                  background:#FFCC99; text-align:left; vertical-align:bottom;
                  width:48pt; height:13.5pt; </style>
              <style ID="6">font-family:Arial; font-size:10pt; color:#000000;
                  background:#FFFF00; text-align:left; vertical-align:bottom;
                  width:48pt; height:13.5pt; </style>
              <style ID="7">font-family:Arial; font-size:10pt; color:#000000;
                  background:#CCFFCC; text-align:right; vertical-align:bottom;
                  width:48pt; height:12.7pt; </style>
              <style ID="8">font-family:Arial; font-size:10pt; color:#000000;
                  background:#CCFFCC; text-align:right; vertical-align:bottom;
                  width:48pt; height:13.5pt; </style>
              <style ID="9">font-family:Arial; font-size:10pt; color:#000000;
                  background:#FFFFFF; text-align:right; vertical-align:bottom;
                  width:48pt; height:13.5pt; </style>
              <style ID="10">font-weight:bold; font-family:Arial; font-
                  size:12pt; color:#000000; background:#FFFFFF; text-align:left;
                  vertical-align:bottom; width:48pt; height:15.7pt; </style>
          </stylelists>
          <numberformatlists count="2">
            <numf ID="1">General</numf>
            <numf ID="2">0</numf>
          </numberformatlists>
          <scriptlists count="2">
            <script ID="1" type="drop">add, subtract, multiply,
    divide</script>
            <script ID="2" type="jscript">
                onChange='isTextValid(this,0,1,1,"")'</script>
          </scriptlists>
          <borderlists count="13">
```

FIG. 4A

```
<border ID="1">border-style:none; </border>
<border ID="2">border-color:#000000 #000000 #000000 #000000 ; border-
    style:solid solid solid solid ; border-width:2px 2px 1px 2px;
    </border>
<border ID="3">border-color:#000000 #000000 #000000 #000000 ; border-
    style:solid solid solid solid ; border-width:1px 2px 1px 2px;
    </border>
<border ID="4">border-color:#000000 #000000 #000000 #000000 ; border-
    style:solid solid solid solid ; border-width:1px 2px 3px 2px;
    </border>
<border ID="5">border-color:#000000 #000000 #000000 #000000 ; border-
    style:solid solid solid solid ; border-width:2px 1px 1px 2px;
    </border>
<border ID="6">border-color:#000000 #000000 #000000 #000000 ; border-
    style:solid solid solid solid ; border-width:1px 1px 2px 2px;
    </border>
<border ID="7">border-color:#000000 #000000 #000000 #000000 ; border-
    style:dotted solid solid solid ; border-width:0px 1px 3px 2px;
    </border>
<border ID="8">border-color:#000000 #000000 #000000 #000000 ; border-
    style:solid solid solid solid ; border-width:2px 1px 1px 1px;
    </border>
<border ID="9">border-color:#000000 #000000 #000000 #000000 ; border-
    style:solid solid solid solid ; border-width:1px 1px 2px 1px;
    </border>
<border ID="10">border-color:#000000 #000000 #000000 #000000 ; border-
    style:dotted solid solid solid ; border-width:0px 1px 3px 1px;
    </border>
<border ID="11">border-color:#000000 #000000 #000000 #000000 ; border-
    style:solid solid solid solid ; border-width:2px 3px 1px 1px;
    </border>
<border ID="12">border-color:#000000 #000000 #000000 #000000 ; border-
    style:solid solid solid solid ; border-width:1px 3px 2px 1px;
    </border>
<border ID="13">border-color:#000000 #000000 #000000 #000000 ; border-
    style:dotted solid solid solid ; border-width:0px 3px 3px 1px;
    </border>
 </borderlists>
</formatlists>
<groups count="1">
 <group name="**All Sections" landscape="false"/>
</groups>
 <iosections count="1">
  <iosection type="Mixed IO" name="Screen0"
      groupname="**All Sections" hidden="false">
   <values sht="Sheet1" r1="1" c1="1" r="7" c="8"/>
   <widths count="8">
     <width pts="48"/>
     <width pts="48"/>
     <width pts="48"/>
     <width pts="48"/>
     <width pts="48"/>
     <width pts="48"/>
     <width pts="48"/>
     <width pts="48"/>
   </widths>
   <heights count="7">
```

FIG. 4B

```
<height pts="15.75"/>
  <height pts="13.5"/>
  <height pts="12.75"/>
  <height pts="13.5"/>
  <height pts="13.5"/>
  <height pts="13.5"/>
  <height pts="12.75"/>
</heights>
<formats r="7" c="8">
  <tr>
      <td style="1" numf="1" border="1"/>
      <td style="1" numf="1" border="1"/>
      <td style="1" numf="1" border="1"/>
      <td style="10" numf="1" border="1" mergeright="5"/>
      <td style="10" numf="1" border="1"/>
      <td style="10" numf="1" border="1"/>
      <td style="1" numf="1" border="1"/>
      <td style="1" numf="1" border="1"/>
  </tr>
  <tr>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
      <td style="2" numf="1" border="1"/>
  </tr>
  <tr>
      <td style="3" numf="1" border="1"/>
      <td style="4" numf="1" border="2"/>
      <td style="7" numf="1" script="2" border="5"/>
      <td style="7" numf="1" script="2" border="8"/>
      <td style="7" numf="1" script="2" border="8"/>
      <td style="7" numf="1" script="2" border="8"/>
      <td style="7" numf="1" border="11"/>
      <td style="3" numf="1" border="1"/>
  </tr>
  <tr>
      <td style="2" numf="1" border="1"/>
      <td style="5" numf="1" border="3"/>
      <td style="8" numf="1" script="2" border="6"/>
      <td style="8" numf="1" script="2" border="9"/>
      <td style="8" numf="1" script="2" border="9"/>
      <td style="8" numf="1" script="2" border="9"/>
      <td style="8" numf="1" border="12"/>
      <td style="2" numf="1" border="1"/>
  </tr>
  <tr>
      <td style="2" numf="1" border="1"/>
      <td style="6" numf="2" script="1" border="4"/>
      <td style="9" numf="1" border="7"/>
      <td style="9" numf="1" border="10"/>
      <td style="9" numf="1" border="10"/>
      <td style="9" numf="1" border="10"/>
      <td style="9" numf="1" border="13"/>
```

FIG. 4C

```
            <td style="2" numf="1" border="1"/>
        </tr>
        <tr>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
            <td style="2" numf="1" border="1"/>
        </tr>
        <tr>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
            <td style="3" numf="1" border="1"/>
        </tr>
      </formats>
    </iosection>
  </iosections>
</model>
```

FIG. 4D

|   | A | B | C | D | E | F | G | H | I |
|---|---|---|---|---|---|---|---|---|---|
| 1 | | | | | | | | | |
| 2 | | | | | | | | | |
| 3 | | | | | | | | | |
| 4 | | | | | | | | | |
| 5 | | | | | | | | | |
| 6 | | | | Simple Illustration | | | | | |
| 7 | | | | | | | | | |
| 8 | | Input 1 | 1 | 2 | 3 | 4 | 5 | | |
| 9 | | Input 2 | 5 | 4 | 3 | 2 | 1 | | |
| 10 | | divide | 0.2 | 0.5 | 1 | 2 | 5 | | |
| 11 | | | | | | | | | |
| 12 | | | | | | | | | |
| 13 | | | | | | | | | |
| 14 | | | | | | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |
| 21 | | | | | | | | | |
| 22 | | | | | | | | | |
| 23 | | | | | | | | | |
| 24 | | | | | | | | | |
| 25 | | | | | | | | | |
| 26 | | | | | | | | | |
| 27 | | | | | | | | | |
| 28 | | | | | | | | | |

FIG. 5

CONVERTING SPREADSHEET APPLICATIONS TO WEB-BASED APPLICATIONS

RELATED APPLICATIONS

This application claims priority to U.S. patent application Ser. No. 11/281,898, filed Nov. 18, 2005 (now U.S. Pat. No. 9,009,582), which claims priority to U.S. provisional patent application Ser. No. 60/629,577, filed Nov. 19, 2004, entitled "System and Method for Converting Spreadsheet Applications to Web-Based Applications," the contents of which are hereby incorporated by reference.

BACKGROUND

A. Field of the Invention

The present disclosure relates generally to spreadsheet applications, and more specifically, to converting spreadsheet applications to web-based spreadsheet applications.

B. Description of the Related Art

Electronic spreadsheets are in widespread use in various industries including finance, business and academia. One of the reasons for their popularity is that spreadsheets greatly facilitate implementation of analytical and/or database applications. However, spreadsheets can present problems when they are distributed or when they are large files.

Distribution of spreadsheets often results in loss of control over the spreadsheets. For example, the receiver of the spreadsheet can easily modify it and redistribute the modified spreadsheet without authorization by the distributor. In addition, the receiver may be able to access proprietary data and/or formulas that the creator may not wish to give to the receiver. Although there are security measures available within current spreadsheet programs such as password protection, they can be defeated. Furthermore, spreadsheets of large size can also create problems when using them. Specifically, spreadsheets can be so large that having multiple spreadsheets active on one computer taxes resources of the computer, increasing the possibility of a computer crash.

SUMMARY

One aspect is directed to a method that may include receiving a spreadsheet application designed to execute using a first spreadsheet program and converting the spreadsheet application into a data file. The data file defines characteristics of a networked version of the spreadsheet application. The characteristics may include information defining cells of the networked version of the spreadsheet application that are to be displayable to a user of the networked version of the spreadsheet application. The method further includes transmitting the data file to a server to make the data file available to network users as the networked version of the spreadsheet application.

Another aspect is directed to a method that may include obtaining a data file, the data file representing a networked version of a spreadsheet application that was converted from a first spreadsheet application and the data file defining characteristics of the networked version of the spreadsheet application including logic and interactivity attributes of cells in the networked version of the spreadsheet. The method further includes receiving a remote request from a client to access the networked version of the spreadsheet application and transmitting, in response to the request, a document to the client that represents a portion of the networked version of the spreadsheet application that the interactivity attributes specify as being displayable to the client.

Yet another aspect includes a method for converting a spreadsheet application to a web-based application. The method includes receiving an extensible markup language (XML) document that was created based on the spreadsheet application, creating a computer program based on the XML document, receiving a request for a display screen of the web-based application from a client, constructing a document for displaying the display screen, and transmitting the document for displaying the display screen to the client.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 3 is a diagram illustrating an exemplary logic file created by the converter computer shown in FIG. 2;

FIGS. 4A-4D are diagrams illustrating an exemplary IO file created by the converter computer shown in FIG. 2;

FIG. 5 is a diagram of an exemplary spreadsheet application that may be converted to create the logic files shown in FIGS. 3 and 4A-4D;

DETAILED DESCRIPTION

The following detailed description of the invention refers to the accompanying drawings. The detailed description does not limit the invention.

Overview

Implementations consistent with the principles of the invention relate to converting a spreadsheet application to a web-based spreadsheet application. The web-based spreadsheet application may exhibit substantially the same appearance and logic as the spreadsheet application. In one implementation, the conversion may be performed using extensible markup language (XML).

System Description

Figure 1:
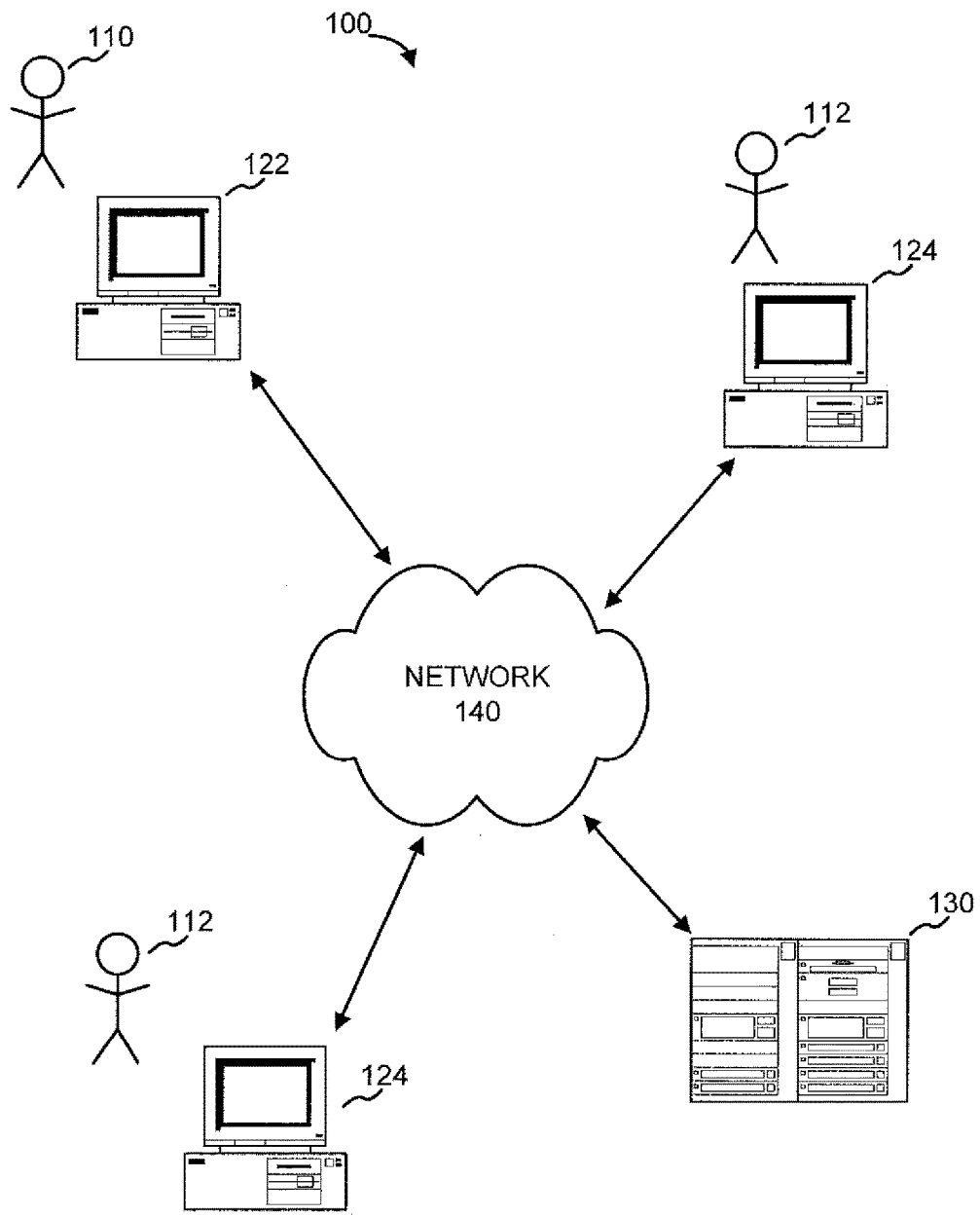
FIG. 1 is a diagram of an exemplary system in which concepts consistent with the principles of the invention may be implemented.

FIG. 1 is a diagram of an exemplary system 100 in which concepts consistent with the principles of the invention may be implemented. System 100 may include users 110 and 112, computers 122 and 124, a server 130, and network 140. User 110 will be described herein as a "user converter" that initiates conversion of a spreadsheet application to a web-based application using "converting" computer 122. Users 112 will be described herein as "user viewers" that may view and interact with the converted web-based application using "viewing" computers 124. One of ordinary skill in the art will recognize that more generally, a single user 110, 112 or computer 122, 124 can function as either or both of a converting user/computer or a viewing user/computer.

Network 140 may include the Internet, an intranet, a wireless network or other types of network alone or in combination. Server 130 may include one or more computing devices designed to interact or serve data to computers 122 and 124. Server 130 and computers 122 and 124 will be described in more detail below. It should be noted that although a single computer 122, two computers 124, a single network 140, and a single server 130 are shown in FIG. 1, in many practical implementations, a typical system 100 may include more of these components.

Figure 2:
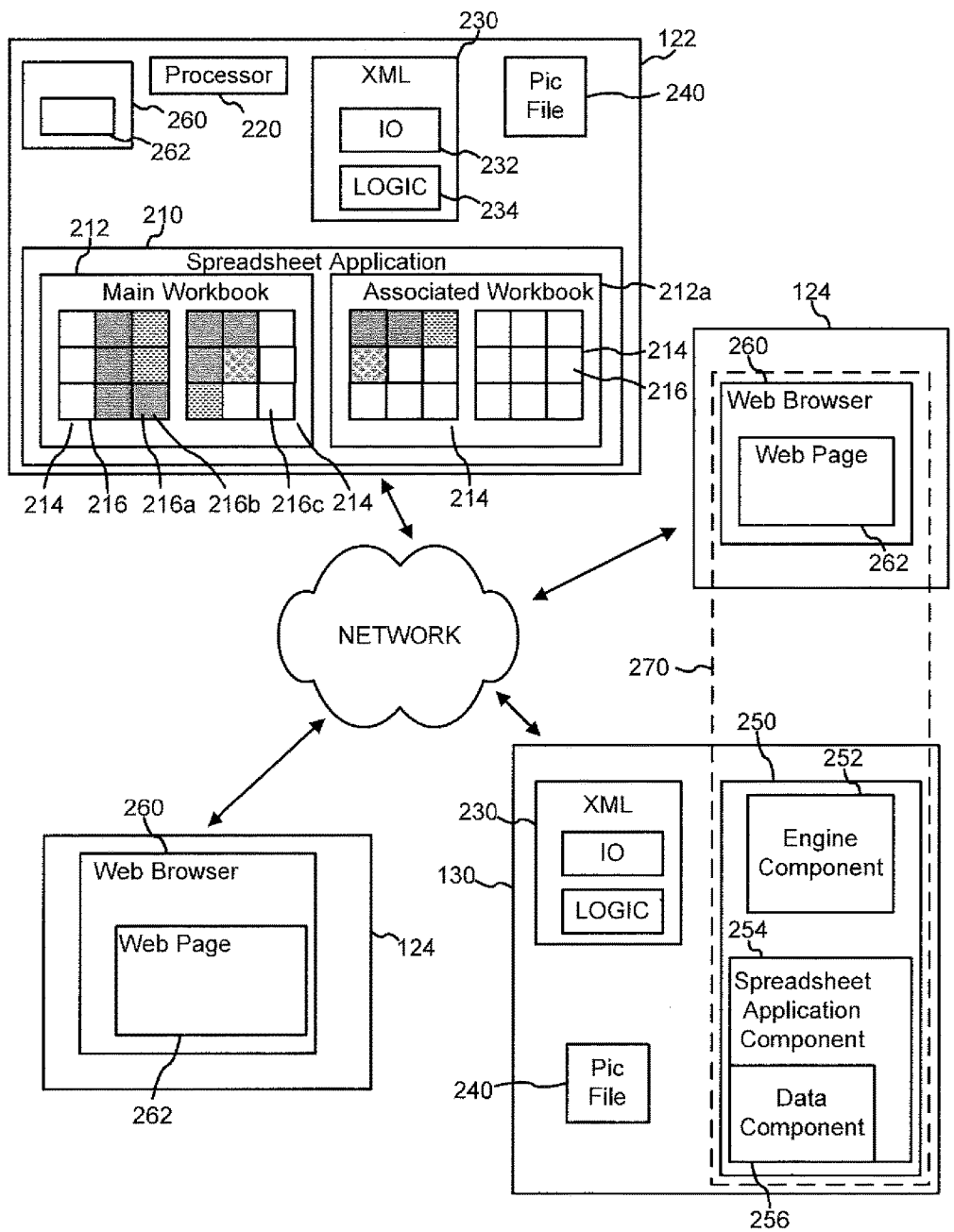
FIG. 2 is a block diagram illustrating an exemplary implementation of the computing devices shown in FIG. 1 in additional detail.

FIG. 2 is a block diagram illustrating an exemplary implementation of computers 122, 124 and server 130 in additional detail.

Converting Computer 122

As shown in FIG. 2, converting computer 122 includes spreadsheet application 210, processor 220, XML document 230, one or more picture files 240, and web browser 260. Processor 220 may include one or more processors that are used to execute the software programs, such as spreadsheet application 210 and web browser 260, that are executing at computer 122. Computer 122 may run a web browsing program such as web browser 260 that is capable of displaying a web page 262.

Spreadsheet application 210 may be a conventional spreadsheet application designed to execute and be used locally on a computer. Spreadsheet application 210 may be organized into a number of viewable sections, such as, for example, a main workbook 212 and one or more associated workbooks 212a. Each workbook 212, 212a may include one or more worksheets 214. Each worksheet 214, in turn, may include one or more cells 216. Cells 216 may be designated by user converter 110 as display cells 216a or smart cells 216c. Display cells 216a, in turn, may be designated by user converter 110 as to whether the cells are editable cells, shown as editable cells 216b. User converter 110 may, for instance, designate all display cells 216a as editable cells 216b or designate all cells 216 as display cells 216a.

Consistent with an aspect of the invention, spreadsheet application 210 may include an analytical application to assist in converting the spreadsheet to a web-based version of the spreadsheet. For example, spreadsheet application 210 may include the Microsoft Excel™ spreadsheet program, available from Microsoft Corporation, augmented with an add-on program to perform the conversion of Excel spreadsheets to a web-based spreadsheet 270. Other spreadsheet programs, such as the OpenOffice.org "Calc" spreadsheet program, may alternatively be used instead of Microsoft Excel™. Spreadsheet application 210 may also include or interact with other applications such as a database application or a modeling application.

Main workbook 212 may be used by user converter 110 to initiate a process to convert spreadsheet application 210 to web-based spreadsheet 270. Associated workbooks 212a may be workbooks that are referred to in formulas in main workbook 212. Display cells 216a may be cells 216 that user converter 110 designates as cells that are to be displayed to user viewer 112 in web-based application 270. Editable cells 216b may be display cells 216a that user converter 110 designates as cells whose content user viewer 112 may modify in web-based application 270. Smart cells 216c may be cells 216 that user converter 110 designates as cells that act as a data interface between web-based application 270 and other applications, such as user tracking applications or DLLs (dynamic link libraries). Smart cells 216c may use an interface such as the SOAP (simple XML-based protocol) interface to exchange data.

Each cell 216 may include logic, such as a constant, a formula, or other inputs permitted by spreadsheet application 210. In addition, each cell 216 may include one or more interactivity attributes that define ways that cell 216 interacts with the user, including how cell 216 is displayed to the user and how the user may modify the cell. Such attributes may comprise cell height, cell width, cell color, acceptable number input range, acceptable input format, dropdown lists, or other attributes that the spreadsheet application 210 uses to define the way cell 216 looks or how it may be manipulated by its user.

Converting computer 122 may collect logic information from each cell 216 and interactivity attribute information from each display cell 216a and convert that information into XML, resulting in XML document 230. XML document 230 may therefore include logic of cells 216 and interactivity attributes of display cells 216a within spreadsheet application 210. XML document 230 can be generally conceptualized as a data file that acts as an intermediary version of the spreadsheet application.

XML document 230 may include a logic file 234 and an input/output file (IO file) 232. An exemplary logic file 234 is shown in FIG. 3 and an exemplary 10 file 232 is shown in FIGS. 4A-4D. Logic file 234 and IO file 232 are derived from the conversion of spreadsheet application 212. An exemplary spreadsheet application 210 that may be converted to obtain logic file 234 and IO file 232 is shown in FIG. 5.

Logic file 234 may include information regarding logic of each cell 216, including information regarding location of smart cells 216c. IO file 232 may include information regarding interactivity attributes of each display cell 216a, including information regarding location of editable cells 216b. In addition, IO file 232 may include information regarding charts located within ranges of display cells 216a so that charts can be recreated in web-based application 270. Such chart information preferably includes chart name, type of chart, sources of data series, colors of the chart, legend information, etc. It should be noted that because IO file 232 may collect interactivity attribute information from display cells 216a, including editable cells 216b, IO file 232 may include interactivity attribute information of only those parts of workbooks 212, 212a that user converter 110 wants displayed to user viewer 112 in the converted web-based spreadsheet application 270. Accordingly, user converter 110 is able to easily "hide" any selected portions of the spreadsheet from user viewer 112.

In one implementation, logic in spreadsheet application 210 may be abbreviated when constructing logic file 234. For example, if adjacent cells 216 contain similar logic, these cells may be grouped together in logic file 234 to describe their logic as a group rather than describing the logic of each cell individually. This concept is illustrated in section 310 of FIG. 3. In another implementation consistent with aspects of the invention, interactivity attribute information may be abbreviated for display cells 216a when constructing I/O file 232. For example, if adjacent display cells 216a contain similar interactivity attributes, these cells may be grouped together in I/O file 232 to describe their interactivity attributes as a group rather than describing interactivity of each cell individually.

Images in spreadsheet application 212 may be processed to obtain picture file(s) 240. Picture file(s) 240 may be referenced as an embedded object in IO file 232 to indicate the name of picture file(s) 240.

Viewing Computer 124 and Server 130

XML file 230 and picture file 240 together contain information necessary to implement the web-based version of spreadsheet application 210. As shown in FIG. 2, XML file 230 and picture file 240 may be uploaded to server 130. Server 130 may implement computer program 250 to construct computer program objects according to information in XML document 230. Additionally, computer program 250 may work in conjunction with web browser 260 on viewing computer 124 to implement web-based application 270.

Server 130 may include XML document 230, one or more picture files 240 and computer program 250. Computer program 250, in turn, may include three components: engine component 252, spreadsheet application component 254 and data component 256. Computer program 250 and web browser 260 can be used to implement web-based application 270.

Engine component 252 of computer program 250 may convert XML document 230 into computer program objects. The objects may include spreadsheet application component 254 and data component 256, which together comprise interactivity attributes of display cells 216a and logic of cells 216. Using spreadsheet application component 254 and data component 256, engine component 252 directs data flow and calculations within computer program 250.

More specifically, web-based application 270 may be implemented by engine component 252 constructing abstract syntax trees (ASTs) using logic contained within spreadsheet application component 254 and data component 256. Each node of the ASTs may include a constant, a function, or a pointer depending on logic of spreadsheet application component 254 and/or data component 256. Engine component 252 may construct only those ASTs necessary to display calculation results in display cells 216a. Therefore, if there is logic contained in spreadsheet application component 254 or data component 256 that does not affect display cells 216a, engine component 254 may not construct ASTs corresponding to that logic. Engine component 252 preferably places the constructed ASTs in spreadsheet application component 254. Engine component 252 may construct new ASTs when user viewer 112 enters new data within web page 262 if the new data requires new ASTs for engine component 252 to perform calculations for displaying display cells 216a.

Figures 6A, 6B:
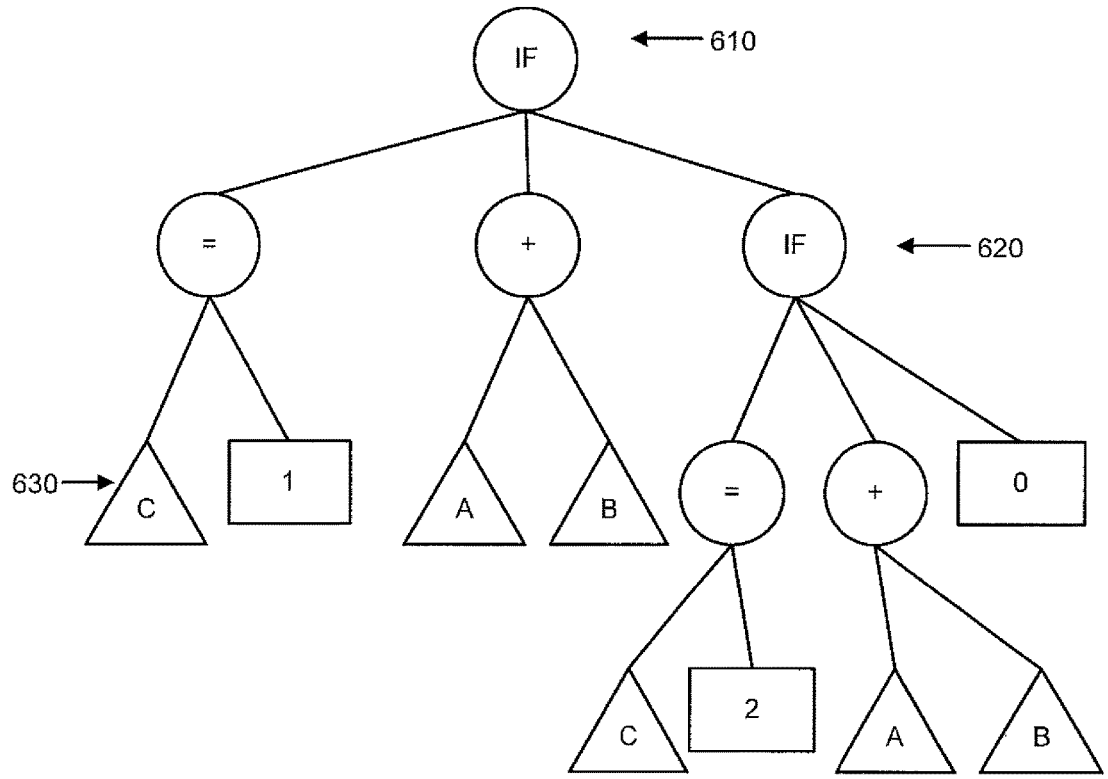
FIGS. 6A and 6B are diagrams illustrating exemplary abstract syntax trees (ASTs)
Figure 7A:
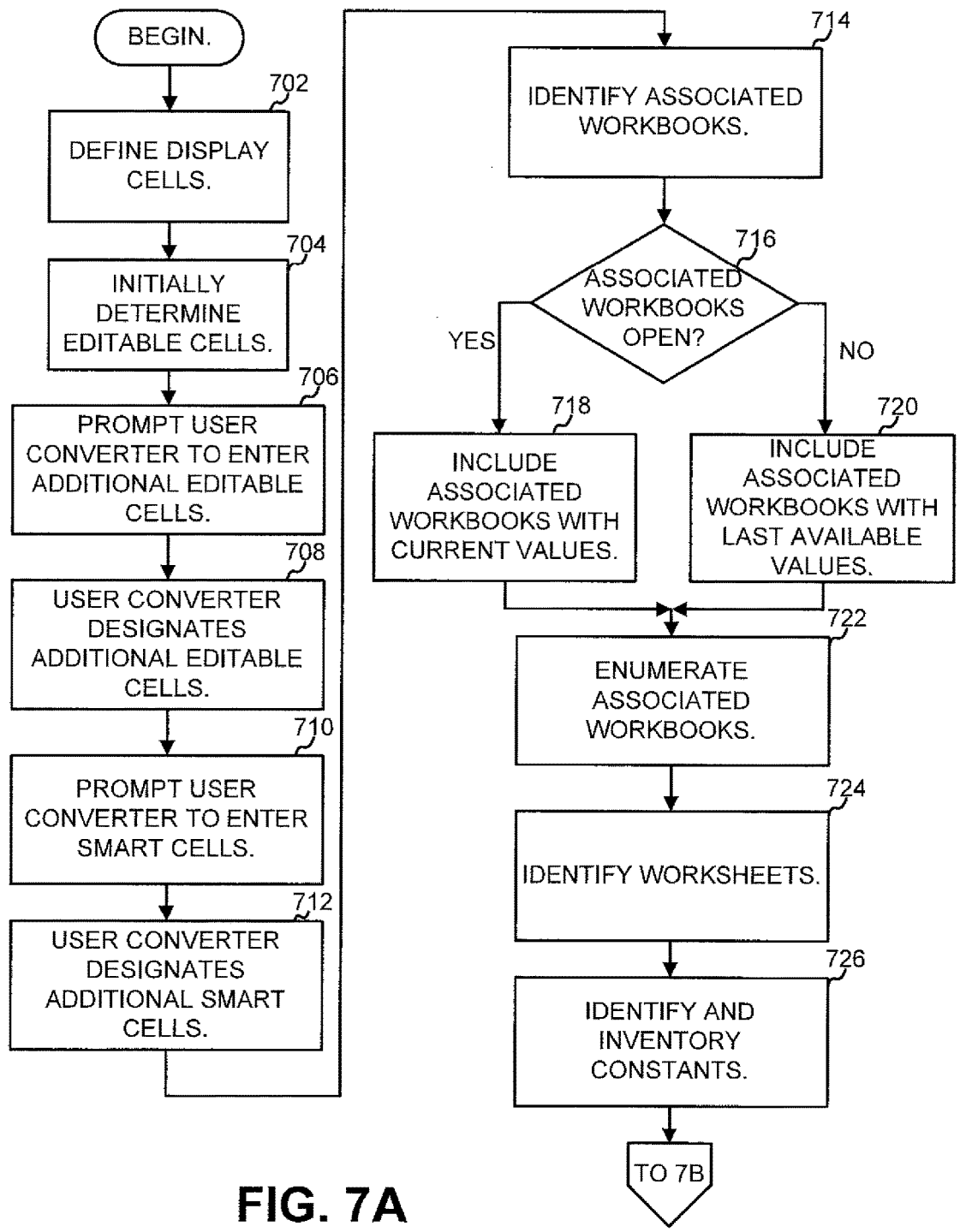
FIGS. 7A-7D are flow charts illustrating exemplary operation of the system shown in FIG. 1 in converting a spreadsheet application to a web-based application.
Figure 7B:
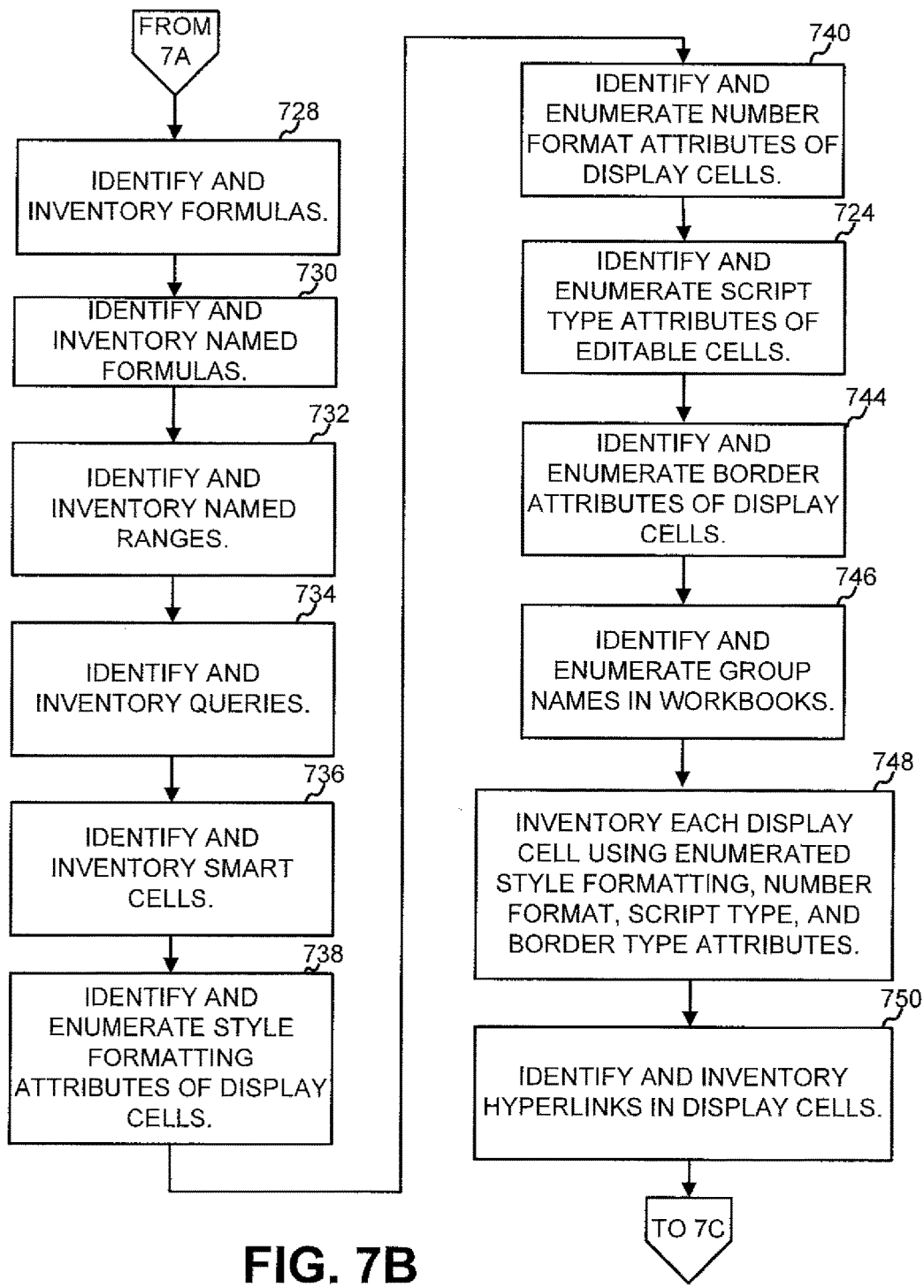
Figure 7C:
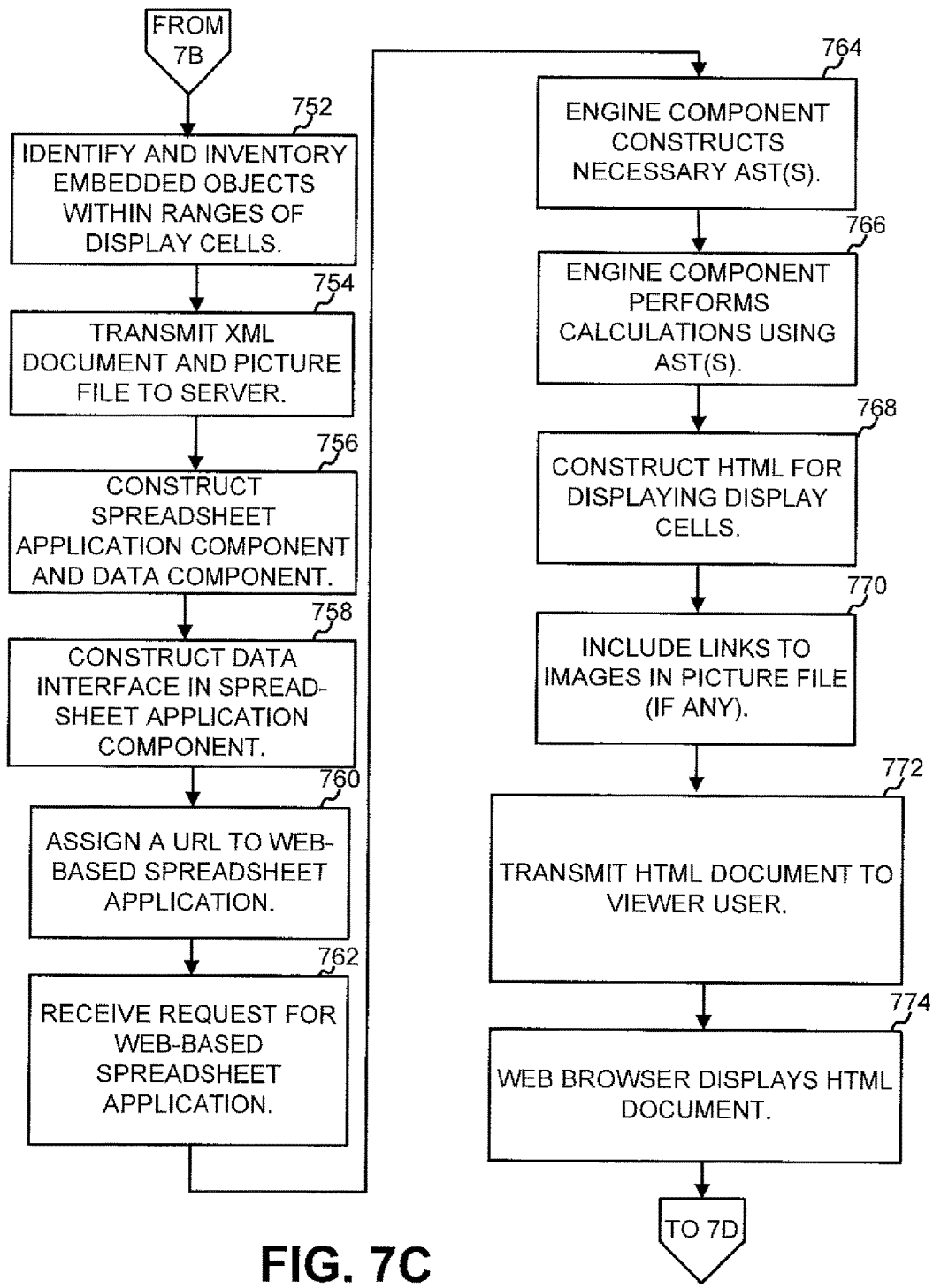
Figure 7D:
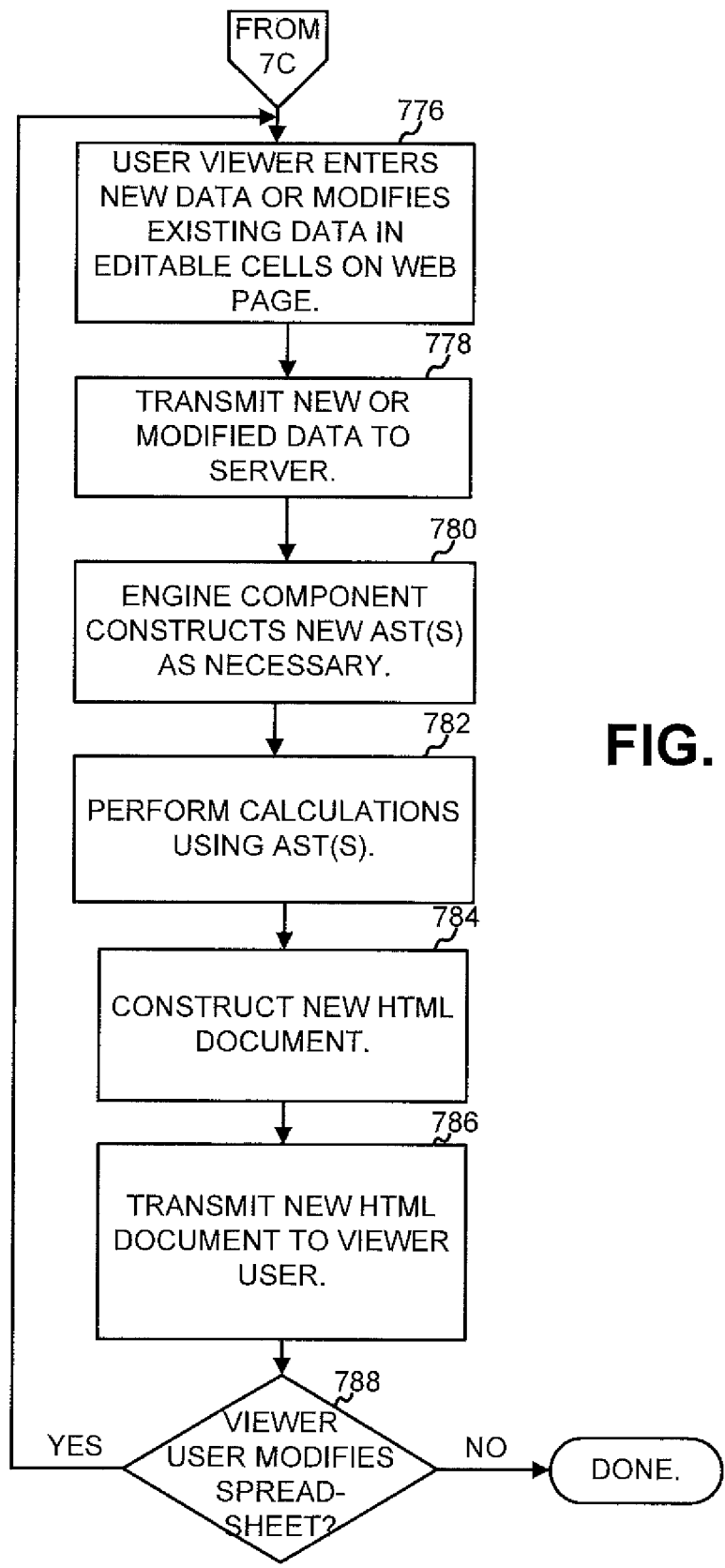

FIGS. 6A and 6B are diagrams illustrating exemplary ASTs. In FIG. 6A, four cells 601-604 are shown. Cells 601-603 each include a constant value and the AST for these cells is simply a single node containing the constant value of the cell. Cell 604, however, includes a function that references constants and other cells.

FIG. 6B is a diagram illustrating the AST for cell 604 in additional detail. Top level node 610 defines the function ("IF") of cell 604. Nodes 620 define the three sub-functions of the function in node 610. Namely, an equals function, a plus function, and another IF function. Nodes 630 relate to the functions defined by nodes 620. For the equals function, for instance, nodes 630 include the two arguments for the function: a pointer to the value in cell "C" (cell 603) and the constant 1. Similarly, for the plus function, nodes 630 define the two arguments as pointers to the values in cells "A" (cell 601) and "B" (cell 602). The IF function in nodes 620 is defined similarly to the IF function in node 610. That is, it includes three lower level nodes within nodes 630 (and any nodes dependent on these nodes).

Returning to FIG. 2, in one implementation, engine component 252 is written in JAVA and spreadsheet application component 254 and data component 256 include JAVA objects. It should be noted that engine component 252 may not change with different spreadsheets, but spreadsheet application component 254 and data component 256 can vary with different spreadsheet, since they are dependent on XML document 230. This type of software architecture is advantageous in that problems within computer program 250 are confined to spreadsheet application component 254 or data component 256 since engine component 252 is already known to operate properly.

Furthermore, computer program 250 may be designed to allow engine component 252 to simultaneously run multiple web-based applications 270. This is possible since web-based-application-specific information is confined to spreadsheet application components 254 and data component 256 objects. Engine component 252 may be capable of managing more than one set of spreadsheet application component 254 and data component 256 that correspond to different web-based applications 270.

User viewers 112 may view and interact with web-based application 270 using web browser 260. For example, computer program 250 may transmit HTML to web browser 260 which, in turn, displays web page 262 that may have substantially the same look and feel of corresponding portions of spreadsheet application 210. Therefore, web-based application 270 presents substantially the same look and feel of corresponding portions of spreadsheet application 210 as well as substantially the same logic as spreadsheet application 210.

One difference between spreadsheet application 210 and web-based application 270 is that user viewers 112 are not able to manually modify values within display cells 216a unless they are designated as editable cells 216b by user converter 110. Display cells 216a that are not editable cells 216b may be altered only by computer program 250 according to logic in spreadsheet application component 254 and/or data component 256.

If a user viewer 112 modifies or enters new data in editable cells 216b in web page 262 and requests a recalculation of web-based application 270, web browser 260 preferably transmits HTML of web page 262, including the new data, to computer program 250. Engine component 252 may then perform calculations with the new data using ASTs. Computer program 250 may construct new ASTs as required for calculations. Computer program 250 may then construct a new HTML page based on the results of the calculations. The new HTML page is transmitted to computer 124, where web browser 260 displays new web page 262. It should be noted that other types of markup language such as XML may be transmitted by computer program 250 to web browser 260.

In an alternative embodiment of the present invention, web-based application 270 may be set to an on-the-fly calculation mode. In this mode, as content of an editable cell is altered by user viewer 112, web browser 260 sends that piece of modified content to computer program 250 rather than the entire HTML of web page 262. This may be performed by including an event in the HTML that responds to any changes to the web page 262. In an another implementation, web browser 260 can be set to periodically send modified HTML to computer program 250 automatically. Engine component 252 performs calculations using ASTs, constructing new ASTs as necessary to complete the calculations. Then, rather than transmitting the entire set of HTML, computer program 250 transmits only the necessary HTML to web page 260 that modifies portions of web page 262 to reflect the new data and calculation results. In still another possible implementation, the user creator may decide that the entire spreadsheet application be converted to HTML instead of specifying certain sections.

The interaction between user viewer 112, web browser 260, web page 262 and computer program 250 may be carried out multiple times. In this way, web browser 260, web page 262 and computer program 250 work together as web-based application 270 that includes substantially the same appearance and logic as spreadsheet application 210 but with some user-application interactivity defined by user converter 110.

The operation of system 100 in converting a spreadsheet application to a web-based application will be described in more detail with reference to the flow charts of FIGS. 7A-7D. Display cells 216a may be defined in workbooks 212 and 212a at converting computer 122 (act 702). This may be done by defining ranges or by highlighting specific cells in workbooks 212 and 212a.

Cells within display cells 216a are initially determined that should be designated as editable cells 216b (act 704). As previously mentioned, an editable cell is one that allows user viewer 112 to modify or enter new data in the cell when interacting with web-based application 270. Cells that are likely to be editable cells may be inferred from the layout of the spreadsheet. User converter 110 may then be prompted to manually designate any additional editable cells 216b within display cells 216a (act 706). In response, if desired, user converter 110 may designate additional editable cells 216b (act 708). User converter 110 may be prompted to designate smart cells 216c so that computer program 250 is capable of exchanging data with other applications (act 710). User converter 110 may designate the smart cells 216c (act 712). In some implementations, smart cells 216c may be automatically determined.

Workbooks 212a that are associated with the main workbook 212 may be identified (act 714). As described above, main workbook 212 is associated with other workbooks 212a if main workbook 212 contains formulas that refer directly or indirectly to other workbooks. Formulas preferably can refer indirectly to other workbooks by referring to an entry in a workbook that, in turn, refers to another workbook. If any of associated workbooks 212a are open, the open associated workbook(s) 212a are included for conversion with their current values (acts 716 and 718). If an associated workbook 212a is not open, these associated workbooks 212a with last available values are included for conversion (acts 716 and 720).

In acts 722-736, logic information is collected from cells 216 and converted into XML, resulting in logic file 234 of XML document 230. The workbooks that are to be converted may be identified and enumerated (act 722). Worksheets 214 within these workbooks are also identified (act 724). For each workbook 212, 212a and each worksheet 214 within workbook 212, 212a, constants may be identified and inventoried within logic file 234 (act 726). For each workbook 212, 212a and each worksheet 214 within workbook 212, 212a, formulas may be identified and inventoried within logic file 234 (act 728).

For workbook 212, 212a and each worksheet 214 within workbook 212, 212a, named formulas, named ranges, queries and smart cells 216c may be respectively identified and inventoried (acts 730-736). Named formulas are formulas within workbooks 212, 212a that have assigned names. Similarly, named ranges may include groups of cells 216 within spreadsheet application 210 that have assigned names. Queries may be capable of obtaining data from outside of spreadsheet application 210 and placing the data within spreadsheet application 210. In one implementation, the data queried may reside in server 130 or is available in other servers.

In acts 738-750, interactivity attribute information from display cells 216a may be collected and converted into XML, resulting in IO file 232 of XML document 230. In some implementations, IO file 232 may be merged with or included as a part of logic file 234. Unique style formatting attributes of display cells 216a may be identified and enumerated in IO file 232 (act 738). A style formatting attribute may be determined by attributes such as font-family, font-size, color, background, text-align, vertical-align, width and height, etc. Unique number format attributes of display cells 216a may be identified and enumerated in IO file 232 (act 740). Unique script type attribute of editable cells 216b may be identified and enumerated in IO file 232 (act 742). Existing border attributes of display cells 216a may also be identified and enumerated in IO file 232 (act 744). A border attribute may include border-style, border-color and border-width.

Existing group names in workbooks 212, 212a may also be identified and inventoried in IO file 232 (act 746). Group names may include names assigned to ranges of display cells 216a by user converter 110 so that each group represents a single web page 262 in web-based application 270. Each display cell 216a may be inventoried to obtain the enumerated style formatting, number format, script type, and border type attributes of display cells 216a (act 748). This information may be stored in IO file 232. Hyperlinks within display cells 216a may be identified and inventoried (act 750). The hyperlinks may point to, for example, additional external web pages or to other sections of the spreadsheet. This information may be stored in IO file 232. Embedded objects within ranges of display cells 216a may also be identified and inventoried (act 752). This information may be stored in IO file 232. For embedded objects that are charts linked with data in spreadsheet application 210, converting computer 122 may indicate in IO file 232 chart attributes such as chart type, source data series, legend information and other information necessary to recreate the chart in web-based application 270. For embedded objects that are images, converting computer 122 may convert that object into one or more picture files 240 and indicate names of picture files 240 as embedded objects in IO file 232.

After assembling XML document 230 and picture files 240, as described above, converting computer 122 may transmit XML document 230 and picture files 240 (if any) to computer program 250 of server 130 (act 754). As previously described, engine component 252 of computer program 250 constructs spreadsheet application component 254 and data component 256 based on information within XML document 230 (act 756). If smart cells exist, engine component 252 may construct data interfaces in spreadsheet application component 254 with which computer program 250 may exchange data with other applications residing in server 130 or other servers networked with server 130 (act 758).

A URL may be assigned to the web-based spreadsheet created by spreadsheet application component 254 and data component 256 (act 760). Server 130 may receive a request for the web-based spreadsheet from user viewer 112 via the URL (act 762). In response, engine component 252 may construct the ASTs necessary to calculate entries in display cells 216a using logic information contained in spreadsheet application component 254 and data component 256, and place the ASTs in spreadsheet application component 254 (act 764). Using the constructed ASTs, engine component 252 may then perform the calculations dictated by the spreadsheet (act 766). The calculations performed in act 766 may include all or substantially all of the calculations defined in the original spreadsheet, including numerical analysis functions and database access functions. Some of the calculations may be particularly suited to a networked environment. For example, the spreadsheet may include a filtering function that allows the user to limit the data shown by setting criteria in a data field, such as, for example, limiting a "date" field to only shown entries after a certain date.

The resultant version of the spreadsheet, including the calculated results and interactivity attribute information, may then be converted into an HTML document that displays display cells 216a (act 768). The HTML document may include links to any images in picture file 240 (act 770). The HTML document may then be transmitted to web browser 260, which, in turn, may display the HTML document as web page 262 to the viewer user 112 (acts 772 and 774). Web page 262 may include links to external items, such as images in picture file 240 from server 130. Web browser 260 may resolve these links and display the images as part of web page 262.

User viewer 112 may enter new data or modify existing data contained in display cells 216a when the display cells are designated as editable cells 216b (act 776). Web browser 260 may then transmit the new or modified data to computer program 250 (act 778). Engine component 252 may then construct new ASTs as necessary for calculations, including logic of smart cells 216c (act 780). Engine component 252 may then perform calculations according to the new ASTs (act 782). The updated version of the spreadsheet may be converted into HTML and transmitted back to viewer user 112 (acts 784 and 786). Acts 776-786 may be repeated each time the user modifies the web-based spreadsheet (act 788).

CONCLUSION

As described above, a web-based spreadsheet application can be automatically created from an existing "conventional" spreadsheet. The web-based spreadsheet can be uploaded to a server and presented to users. The web-based spreadsheet may provide a number of advantages over conventional spreadsheets. For example, formulas or other information in a spreadsheet that the spreadsheet author would like to hide from the viewer may reside only at the server and not be sent to the viewer, thus making it impossible for the viewer to learn this information. Additionally, because the calculations for the spreadsheet may be performed at the server, complex or large spreadsheets may still be displayed at the viewing computer without overburdening the viewing computer.

The foregoing description of exemplary embodiments of the invention provides illustration and description, but are not intended to be exhaustive or to limit the invention to the precise form disclosed. Modifications and variations are possible in light of the above teachings or may be acquired from practice of the invention. For example, while a spreadsheet application was primarily described herein as being created with a convention spreadsheet program, the spreadsheet application could itself have been directly created as an online or web-based application.

For example, while a series of acts have been described with regard to FIGS. 7A-7D, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
receiving a spreadsheet application designed to execute using a spreadsheet program; converting the spreadsheet application into a data file, wherein the spreadsheet application includes one or more cells and wherein at least some of the cells implement logical functions, the data file defining characteristics of a networked version of the spreadsheet application that was converted from the spreadsheet application, wherein the networked version of the spreadsheet application is converted from the spreadsheet application by applying permissions that are set in the spreadsheet application, the permissions not being applied in the spreadsheet application, wherein the characteristics defined by the data file are defined based on the permissions, the characteristics including information defining cells of the networked version of the spreadsheet application that are to be displayable to a user of the networked version of the spreadsheet application;

transmitting the data file to a server to make the data file available to network users as the networked version of the spreadsheet application;

executing, by the server, a computer program that includes an engine component;

converting, by the engine component, the data file into a spreadsheet application component and a data component, wherein the spreadsheet application component and the data component include information defining logical functions implemented by at least some of cells included in the spreadsheet application;

constructing, by the engine component, at least one abstract syntax tree using the spreadsheet application component and the data component, wherein the at least one abstract syntax tree includes, based on the information included in the spreadsheet application component and the data component, at least one of a constant, a function, or a pointer; and generating, by the computer program, an HTML document using the at least one abstract syntax tree, wherein the HTML document includes information that represents the defined characteristics of the networked version of the spreadsheet application.

2. The method of claim 1, wherein the networked version of the spreadsheet application is a web-based version of the spreadsheet application.

3. The method of claim 1, wherein the data file is an extensible markup language (XML) data file.

4. The method of claim 1, wherein the data file further includes information defining interactivity attributes of each of the displayable cells.

5. The method of claim 4, wherein the information regarding the interactivity attributes of the displayable cells is abbreviated.

6. The method of claim 1, wherein the data file further includes information defining logical functions implemented by cells in the spreadsheet application.

7. The method of claim 6, wherein the logical functions include information defining formulas stored in the cells.

8. The method of claim 6, wherein the logical functions include information defining data filtering functions.

9. The method of claim 6, wherein the logical functions include information defining a data interface between the spreadsheet application and other applications.

10. The method of claim 6, wherein the logical functions are abbreviated in the data file.

11. The method of claim 1, wherein the networked version of the spreadsheet application comprises the same logic as the spreadsheet application.

12. A non-transitory computer-readable medium storing instructions, the instructions comprising:
one or more instructions which, when executed by a processor, cause the processor to:
receive a spreadsheet application designed to execute using a spreadsheet program, wherein the spreadsheet application includes one or more cells and wherein at least some of the cells implement logical functions;
convert the spreadsheet application into a data file, the data file defining characteristics of a networked version of the spreadsheet application that was converted from the spreadsheet application, wherein the networked version of the spreadsheet application is converted from the spreadsheet application by applying permissions that are set in the spreadsheet application, the permissions not being applied in the spreadsheet application, wherein the characteristics defined by the data file are defined based on the permissions,
the characteristics including logic and interactive attributes of cells of the networked version of the spreadsheet application;
transmit the data file to a server configured to make the data file available to network users as the networked version of the spreadsheet application;
convert the data file into a spreadsheet application component and a data component, wherein the spreadsheet application component and the data component include information defining logical functions implemented by at least some of cells included in the spreadsheet application;

construct at least one abstract syntax tree using the spreadsheet application component and the data component, wherein the at least one abstract syntax tree includes, based on the information included in the spreadsheet application component and the data component, at least one of a constant, a function, or a pointer; and generate an HTML document using the at least one abstract syntax tree, wherein the HTML document includes information that represents the defined characteristics of the networked version of the spreadsheet application.

13. The computer-readable medium of claim 12, wherein the data file is an extensible markup language (XML) data file.

14. The computer-readable medium of claim 12, wherein the data file further includes information defining interactivity attributes of each of the displayable cells,
the information regarding the interactivity attributes of the displayable cells being abbreviated.

15. The computer-readable medium of claim 12, wherein the data file further includes information defining logical functions implemented by cells in the spreadsheet application,
the logical functions including at least one of:
information defining formulas stored in the cells, information defining data filtering functions, or
information defining a data interface between the spreadsheet application and other applications.

16. A device comprising:
a memory to store instructions; and
a processor to execute the instructions to:
receive a spreadsheet application designed to execute using a spreadsheet program, wherein the spreadsheet application includes one or more cells and wherein at least some of the cells implement logical functions;
convert the spreadsheet application into a data file,
the data file defining characteristics of a networked version of the spreadsheet application that was converted from the spreadsheet application, wherein the networked version of the spreadsheet application is converted from the spreadsheet application by applying permissions that are set in the spreadsheet application, the permissions not being applied in the spreadsheet application, wherein the characteristics defined by the data file are defined based on the permissions,
the characteristics including information defining cells of the networked version of the spreadsheet application that are to be displayable to a user of the networked version of the spreadsheet application;
transmit the data file to a server to make the data file available to network users as the networked version of the spreadsheet application;
convert the data file into a spreadsheet application component and a data component, wherein the spreadsheet application component and the data component include information defining logical functions implemented by at least some of cells included in the spreadsheet application;
construct at least one abstract syntax tree using the spreadsheet application component and the data component, wherein the at least one abstract syntax tree includes, based on the information included in the spreadsheet application component and the data component, at least one of a constant, a function, or a pointer; and generate an HTML document using the at least one abstract syntax tree, wherein the HTML document includes information that represents the defined characteristics of the networked version of the spreadsheet application.

17. The device of claim 16, wherein the networked version of the spreadsheet application is a web-based version of the spreadsheet application, and the data file is an extensible markup language (XML) data file.

18. The device of claim 16, wherein the data file further includes information defining interactivity attributes of each of the displayable cells, the information regarding the interactivity attributes of the displayable cells being abbreviated.

19. The device of claim 16, wherein the data file further includes information defining logical functions implemented by cells in the spreadsheet application, the logical functions including at least one of: information defining formulas stored in the cells, information defining data filtering functions, or information defining a data interface between the spreadsheet application and other applications.

20. The device of claim 16, wherein the networked version of the spreadsheet application comprises the same logic as the spreadsheet application.

* * * * *